US011433995B2

(12) United States Patent
Bottasso et al.

(10) Patent No.: US 11,433,995 B2
(45) Date of Patent: Sep. 6, 2022

(54) HELICOPTER KIT

(71) Applicant: LEONARDO S.P.A., Rome (IT)

(72) Inventors: Luigi Bottasso, Samarate (IT); Attilio Colombo, Samarate (IT); Pierangelo Masarati, Samarate (IT); Aykut Tamer, Samarate (IT); Giuseppe Quaranta, Samarate (IT)

(73) Assignee: LEONARDO S.P.A., Rome (IT)

( * ) Notice: Subject to any disclaimer, the term of this patent is extended or adjusted under 35 U.S.C. 154(b) by 365 days.

(21) Appl. No.: 16/763,043

(22) PCT Filed: Jun. 28, 2019

(86) PCT No.: PCT/IB2019/055515
§ 371 (c)(1),
(2) Date: May 11, 2020

(87) PCT Pub. No.: WO2020/021358
PCT Pub. Date: Jan. 30, 2020

(65) Prior Publication Data
US 2020/0391857 A1    Dec. 17, 2020

(30) Foreign Application Priority Data
Jul. 27, 2018   (EP) .................................... 18186028

(51) Int. Cl.
*B64C 27/00*        (2006.01)
*B64C 27/06*        (2006.01)
(Continued)

(52) U.S. Cl.
CPC ............ *B64C 27/001* (2013.01); *B64C 27/06* (2013.01); *F16F 7/1022* (2013.01); *F16F 15/02* (2013.01);
(Continued)

(58) Field of Classification Search
CPC . B64C 27/001; B64C 27/06; B64C 2027/002; B64C 2027/004; F16F 15/02;
(Continued)

(56) References Cited

U.S. PATENT DOCUMENTS 3,921,940 A * 11/1975 Mouille ................ B64C 27/001
                                                244/17.27
4,094,387 A *  6/1978 Pelat ....................... F16L 3/202
                                                  188/381
(Continued)

FOREIGN PATENT DOCUMENTS

JP          S6078130        5/1985

*Primary Examiner* — Medhat Badawi
(74) *Attorney, Agent, or Firm* — Leason Ellis LLP

(57) ABSTRACT

A kit for a helicopter is described, the helicopter comprising a fuselage and a rotor; the kit comprises at least one device adapted to dampen the vibrations transmitted from the rotor to the fuselage and to be interposed between the fuselage and the rotor; the device, in turn, comprises a first threaded element operatively connectable to the rotor and adapted to, in use, vibrate parallel to a first axis; a second threaded element operatively connectable to the fuselage and operatively connected to the first threaded element so as to, in use, rotationally vibrate about the first axis; and a plurality of threaded rollers, which are screwed on the first and second threaded elements; the rollers being rotatable about their respective second axes parallel to and separate from the first axis with respect to the first and second threaded elements; the rollers are also rotatable about the first axis with respect to the first threaded element and the second threaded element.

14 Claims, 3 Drawing Sheets

(51) Int. Cl.
*F16F 7/10* (2006.01)
*F16F 15/02* (2006.01)
*F16H 25/22* (2006.01)

(52) U.S. Cl.
CPC ..... *B64C 2027/002* (2013.01); *F16F 2222/08* (2013.01); *F16F 2232/02* (2013.01); *F16F 2232/06* (2013.01); *F16H 25/2252* (2013.01)

(58) Field of Classification Search
CPC .. F16F 7/1022; F16F 2222/08; F16F 2232/02; F16F 2232/06; F16H 25/2252; F01D 25/04
See application file for complete search history.

(56) References Cited

U.S. PATENT DOCUMENTS

| | | | | |
|---|---|---|---|---|
| 4,187,933 A * | 2/1980 | Calabrese | ............... | F16L 3/202 188/134 |
| 4,239,456 A * | 12/1980 | Joglekar | ............... | B64C 27/001 416/500 |
| 4,255,084 A * | 3/1981 | Mouille | ............... | B64C 27/001 416/500 |
| 4,281,967 A * | 8/1981 | Mouille | ................. | F16F 15/10 416/500 |
| 4,403,681 A * | 9/1983 | Desjardins | ........... | B64C 27/001 244/17.27 |
| 5,316,240 A * | 5/1994 | Girard | ................ | B64C 27/001 188/380 |
| 5,568,847 A * | 10/1996 | Guilloud | ............... | F16F 15/023 188/322.19 |
| 5,810,319 A * | 9/1998 | von Flotow | ........... | F16F 7/1011 181/207 |
| 6,045,090 A * | 4/2000 | Krysinsky | ............ | B64C 27/001 244/17.27 |
| 6,283,408 B1 * | 9/2001 | Ferullo | ................... | F16F 7/104 244/54 |
| 7,857,255 B2 * | 12/2010 | Pancotti | ............... | B64C 27/001 318/128 |
| 8,328,129 B2 * | 12/2012 | Smith | ...................... | F16F 7/10 244/17.11 |
| 8,985,502 B2 * | 3/2015 | Krysinski | ........... | B64C 27/001 244/17.11 |
| 9,995,168 B2 * | 6/2018 | Colombo | ............... | F01D 25/04 |
| 11,214,362 B2 * | 1/2022 | Foskey | ................ | B64C 27/001 |
| 11,247,771 B2 * | 2/2022 | Bottasso | .............. | F16F 7/1022 |
| 2008/0173754 A1 * | 7/2008 | Strehlow | ............... | B64C 27/001 244/17.13 |
| 2009/0321556 A1 * | 12/2009 | Pancotti | ............... | B64C 27/001 244/17.27 |
| 2010/0215496 A1 * | 8/2010 | Nannoni | ............... | B64C 27/635 416/135 |
| 2015/0098801 A1 * | 4/2015 | Colombo | ................ | F16F 7/116 415/119 |
| 2017/0137120 A1 * | 5/2017 | Bottasso | ................ | B64C 27/82 |
| 2018/0135717 A1 * | 5/2018 | Fox | ..................... | F16F 15/1204 |
| 2019/0352000 A1 * | 11/2019 | Bottasso | ............... | B64C 27/12 |
| 2020/0122825 A1 * | 4/2020 | Bottasso | ................ | B64C 27/32 |
| 2020/0298968 A1 * | 9/2020 | Quaranta | ............. | B64C 27/001 |
| 2020/0385105 A1 * | 12/2020 | Bottasso | ................ | F16F 7/1022 |
| 2020/0391857 A1 * | 12/2020 | Bottasso | ................ | F16F 15/02 |

* cited by examiner

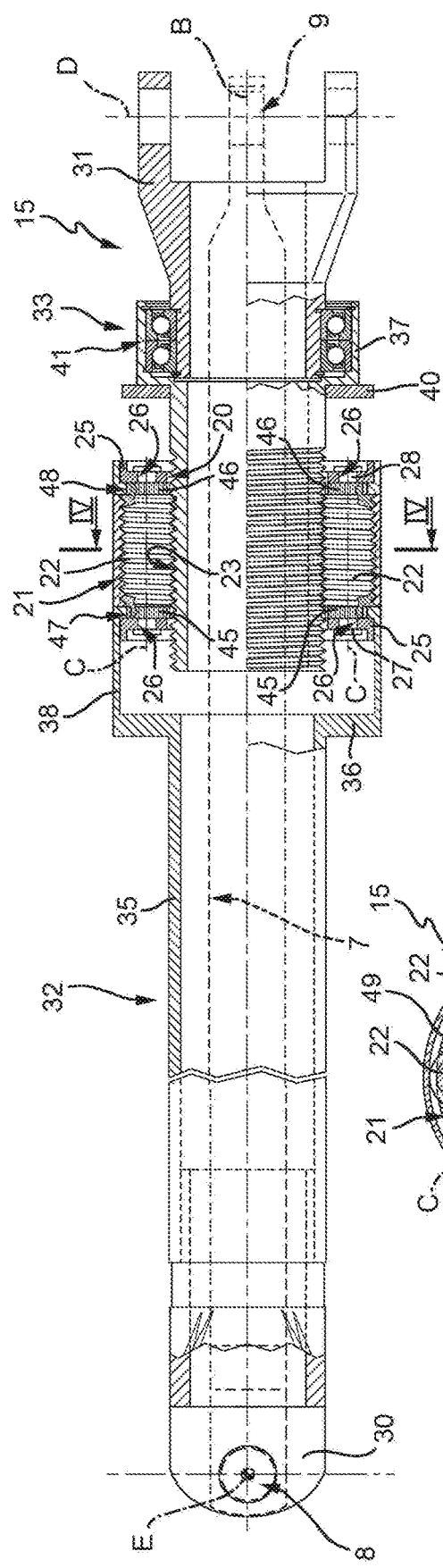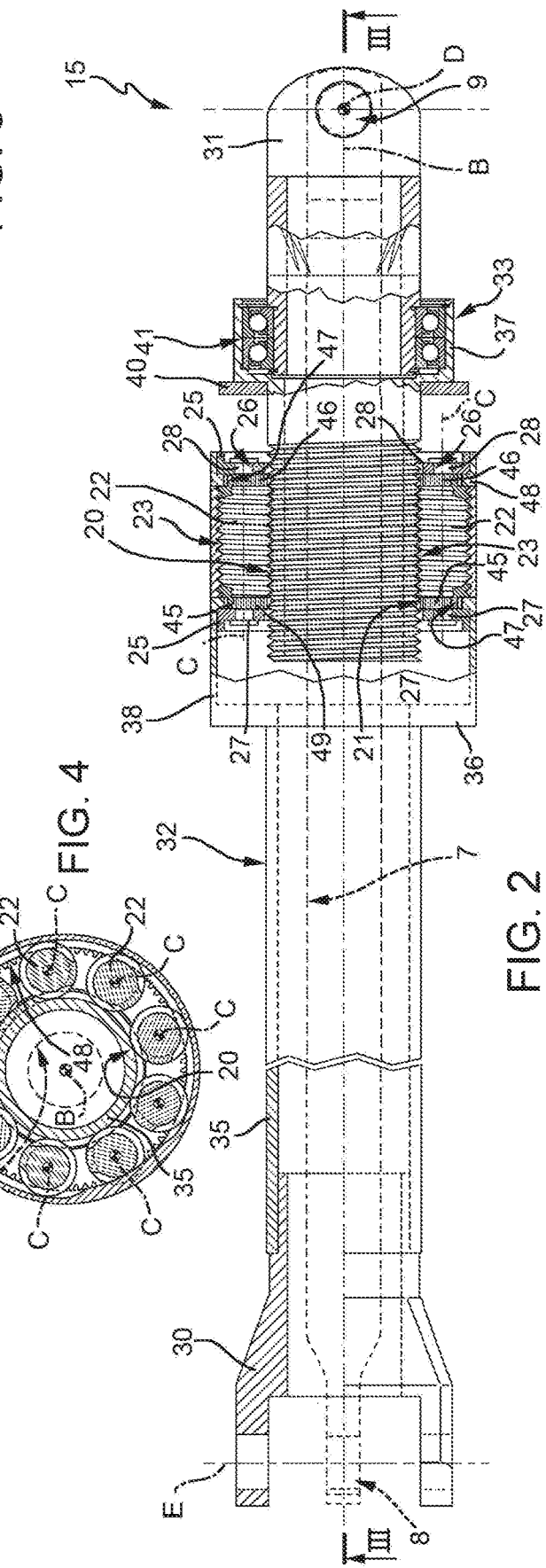

HELICOPTER KIT

CROSS-REFERENCE TO RELATED APPLICATIONS

This patent application is a U.S. National Phase Application under 35 U.S.C. § 371 of International Patent Application No. PCT/IB2019/055515, filed on Jun. 28, 2019, which claims priority from European patent application no. 18186028.9 filed on Jul. 27, 2018, all of which are incorporated by reference, as if expressly set forth in their respective entireties herein.

TECHNICAL FIELD

The present invention relates to a kit for a helicopter.

BACKGROUND ART

Helicopters are known to basically comprise a fuselage, a main rotor positioned on the top of the fuselage and rotating about its own axis, and a tail rotor located at an end of the fuselage.

In greater detail, the rotor, in turn, basically comprises:
a support casing;
a hub rotatable about the aforesaid axis and equipped with a plurality of blades radially fastened to and projecting from the aforesaid hub; and
a mast that can be connected to a drive member and operatively connected to the hub to drive it in rotation.

The fuselage is normally constrained to the rotor by a plurality of connecting rods and an anti-torque plate; in other words, the fuselage is "suspended" from the support casing.

In use, operation of the rotor causes the creation of high and low frequency vibrations. More specifically, low-frequency vibrations are generated by the wash separating from the blades and from the centre of the hub. This separation takes place at the centre of the hub and affects the vertical and horizontal aerodynamic tail surfaces and the tail rotor.

The rotation of the blades at high angular speeds causes, in use, the generation of further high-frequency vibrations, which are transmitted to the mast, and therefore to the fuselage, deteriorating comfort for the occupants of the fuselage.

Within the industry, it is known that the vibratory loads acting on the rotor have pulses equal to N*Ω and multiples thereof in the reference system integral with the fuselage, where Ω is the rotation speed of the mast and N represents the number of blades of the rotor.

In other words, the hub and the mast transfer the vibratory aerodynamic load pulses acting in the plane of the blades on the aforesaid pulses.

From the foregoing, there is a clearly felt need within the industry for limiting transmission from the mast to the fuselage of vibrations with the aforementioned pulse values equal to N*Ω and multiples thereof.

To this end, there are known passive and active damping devices.

Passive damping devices basically comprise masses elastically suspended from the mast or the hub by springs. The vibration of these suspended masses enables at least partially absorb the vibrations on the mast and the hub.

The aforementioned damping devices convert the kinetic energy in the elastically supported movement of the aforementioned masses and exert a damping force proportional to the spring modulus and the displacement of the masses.

Alternatively, active damping devices are basically actuators that exert a sinusoidal damping force on the hub or on the mast, which counters the force generated by the vibrations.

Damping devices, that work by absorbing vibration via a passive vibrating element, require the use of combinations of masses and springs in standard layouts and have minimum overall dimensions that limit flexibility of use.

Active damping devices are expensive and complex to manufacture.

A further, recently developed solution is represented by so-called "inertance" devices, known as "inerters".

These devices are interposed between a first point and a second point, and exert a force on them proportional to the difference in accelerations between the first and the second points, the acceleration components along the line joining the two points being intended.

Through opportune calibration of the inertia values, it is possible to ensure that this force reduces or cancels the transmission of vibrations with a given frequency between the first and second points.

One of the first examples of these inerter-type devices is illustrated in EP-B-1402327 and basically comprises:
a rod connected to the first point;
a casing connected to the second point and the rod can slide in respect thereto; and
a flywheel connected to the rod and rotatable inside the casing as a result of the rod sliding due to vibrations on the first point.

US-A-2009/0108510 describes a further inerter-type damping device.

There is awareness in the industry of the need to have an inerter-type damping device that is easily integrable in helicopters of known type without altering the aerodynamic configuration of the helicopter.

There is also awareness in the industry of the need to have an inerter-type damping device that is particularly compact, particularly accurate and able to dampen large-amplitude vibrations.

There is also awareness in the industry of the need to have an inerter-type damping device that is long-lasting, has a high load capacity and the lowest possible friction.

JP-A-56078130 discloses a kit according to the preamble of claim 1 and 9.

DISCLOSURE OF INVENTION

The object of the present invention is to provide a kit for a helicopter that enables satisfying at least one of the aforementioned needs in a simple and inexpensive manner.

The aforementioned object is achieved by the present invention, in so far as it relates to a kit for a helicopter according to claim 1.

The present invention also relates to a kit for a helicopter, according to claim 9.

BRIEF DESCRIPTION OF THE DRAWINGS

For a better understanding of the present invention, a preferred embodiment is described hereinafter, purely by way of non-limitative example and with reference to the accompanying drawings, in which:

FIG. 2 is a section, on an enlarged scale, along the axis II-II of FIG. 1 of a component of the kit of FIG. 1, with parts removed for clarity;

FIG. 3 is a section, on an enlarged scale, along line III-III of FIG. 2 of the component of FIG. 2, with parts removed for clarity;

FIG. 4 is a section along the line IV-IV of FIG. 3; and

BEST MODE FOR CARRYING OUT THE INVENTION

Figure 1:
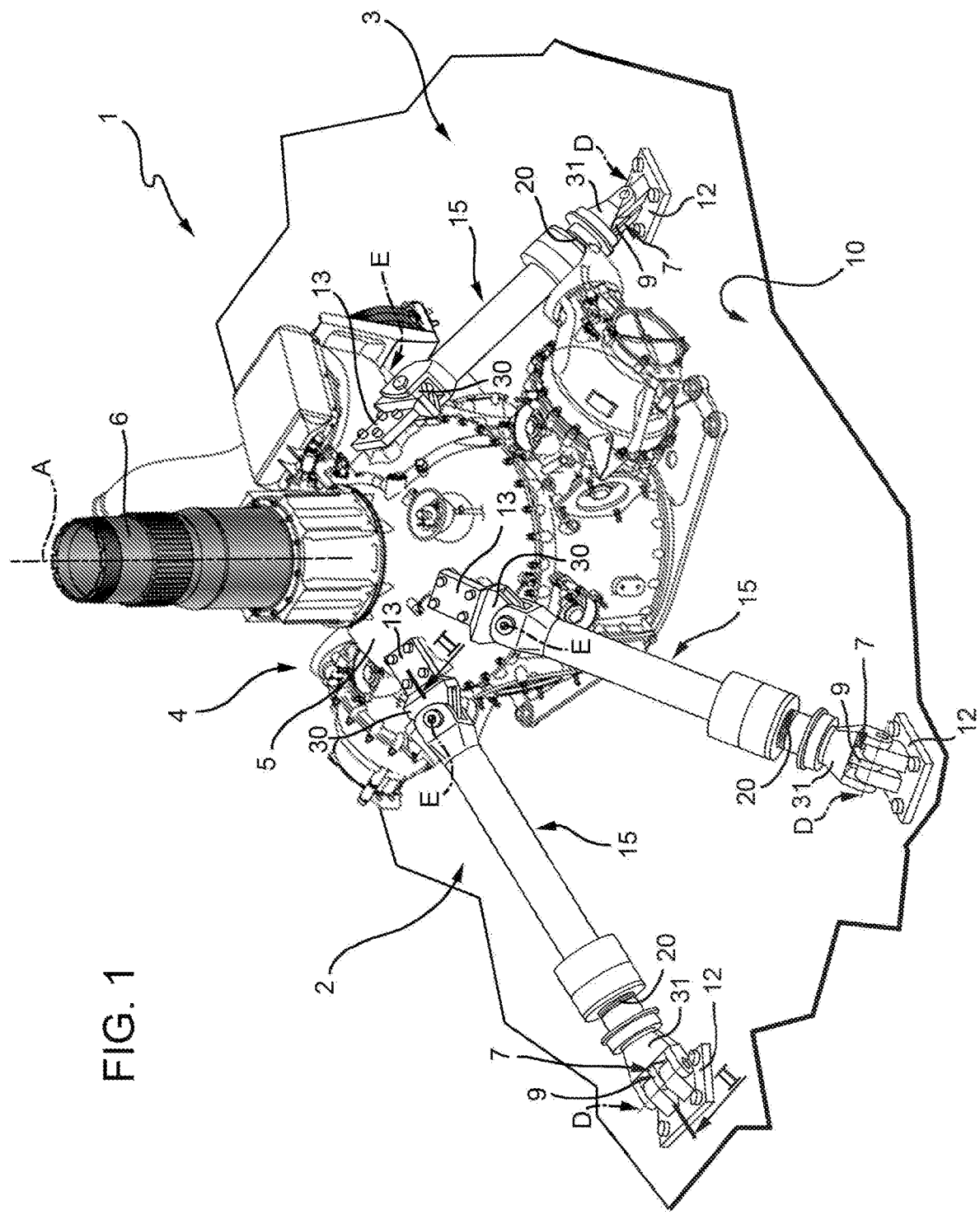
FIG. 1 is a perspective side view of a main rotor of a helicopter with a kit according to the present invention, with parts removed for clarity.

Referring to FIG. 1, the reference numeral 1 indicates a kit for a helicopter 2.

Figure 5:
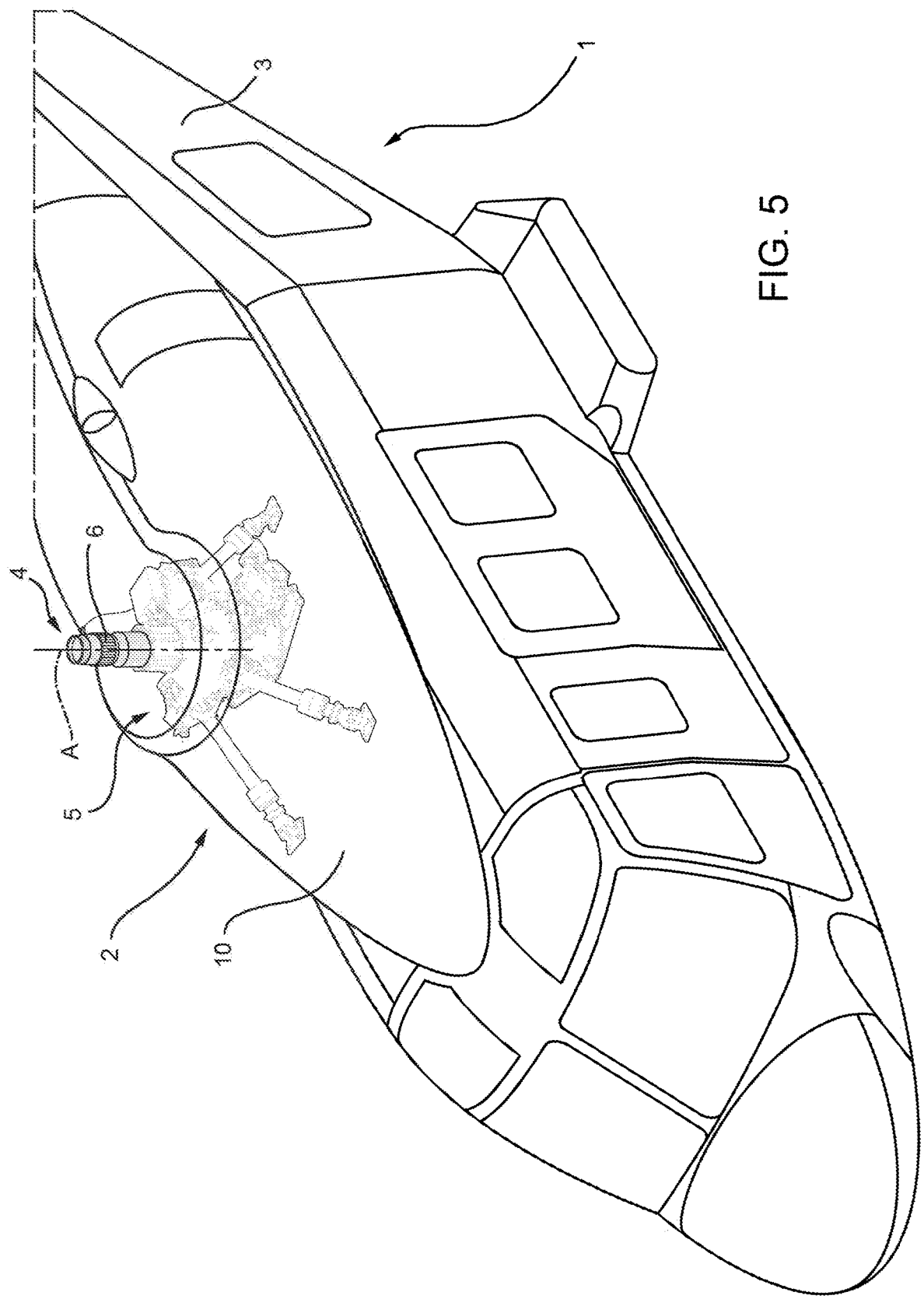
FIG. 5 is a perspective view, on a highly enlarged scale, of a helicopter incorporating the kit of FIGS. 1 to 4.

Referring to FIG. 5, the helicopter 2 basically comprises a fuselage 3, a main rotor 4 positioned on the top of the fuselage 3 and rotating about an axis A, and a tail rotor located at one end of the fuselage 3 and rotating about its own axis, transversal to axis A.

In greater detail, the rotor 4 is only shown with regards to:
a support casing 5;
a mast 6 rotating about the axis A, coupled, in a manner not shown, with a drive unit, for example a turbine, carried by the helicopter 1 and operatively connected to a hub (not shown) on which a plurality of blades (also not shown) are hinged.

The helicopter 2 also comprises a plurality of rods 7, which extend along respective axes B that are oblique to the axis A and have respective ends 8 and 9 opposite each other, respectively fastened to the casing 5 and to a top portion 10 of the fuselage 3.

The rods 7 are hinged to respective anchors 12 and 13 carried by the top portion 10 and by the casing 5, respectively, about respective axes D and E.

The kit 1 comprises a plurality of devices 15 for damping vibrations transmitted to the fuselage 3 by the rotor 4.

In the case shown, there are four devices 15 associated with respective rods 7.

Referring to FIGS. 2 to 4, the devices 15 extend along respective axes B, are hollow and house the associated rods 7.

As the devices 15 are identical, only a single device 15 is described below.

Advantageously, the device 15 comprises (FIGS. 2 to 4):
a female screw 21 connected to the rotor 4 and adapted to vibrate parallel to the axis B;
a screw 20 connected to the fuselage 3, operatively connected to the female screw 21 so as to rotationally vibrate about axis B; and
a plurality of threaded rollers 22, which have a thread 23 screwed on the screw 20 and on the female screw 21, are rotatable about their respective axes C parallel to and separate from the axis B and are also rotatable around axis B with respect to the screw 20 and the female screw 21.

In this way, the device 15 implements an inerter, namely a device capable of exerting a force on the fuselage 3 and on the casing 5 proportional to the difference in acceleration between the fuselage 3 and the casing 5.

This force enables damping the vibrations generated by operation of the rotor 4 and curbing their transmission to the fuselage 3.

In greater detail, the device 15 comprises:
a tubular axial end lug 30 fastened to the casing 5; and
a tubular axial end lug 31, axially opposite to the lug 30 and fastened to the top portion 10 of the fuselage 2.

The lugs 30 and 31 are hinged to respective anchors 12 and 13 about respective axes D and E.

As a consequence, lug 30 is subjected to an alternating movement of axial vibration parallel to the axis B, which is caused by the vibratory loads transmitted by the casing 5.

The device 15 also comprises, interposed between the lugs 30 and 31:
a tubular body 32 fastened to lug 30 and defining, on the part axially opposite to lug 30, the female screw 21; and
a tubular body 33 fastened to lug 31 and defining, on the part axially opposite to lug 30, the screw 20.

In particular, tubular body 32 comprises, in turn, at its mutually opposite axial ends:
a cup-shaped portion 35 connected to lug 30; and
a cup-shaped portion 36, having a larger diameter than portion 35 and defining the female screw 21.

In turn the tubular body 33 comprises:
a cup-shaped portion 37 connected to lug 31; and
a portion 38 having a longer length than the portion 37 and a smaller diameter than the portion 37, and defining the screw 20.

Portion 38 of tubular body 33 has a smaller diameter than portion 36 of tubular body 32.

Portion 38 of tubular body 33 is housed inside portion 36 of tubular body 32.

The screw 20 and the female screw 21 have multi-start threads.

The screw 20 and the female screw 21 are arranged radially facing each other and radially spaced apart from each other with respect to axis B.

The rollers 22 are arranged in a position radially interposed between the screw 20 and the female screw 21 in a direction radial to axis B.

The rollers 22 extend along their respective axes C and each have an external thread 23.

Thread 23 is simultaneously screwed onto the female screw 21 and onto the screw 20.

The rollers 22 extend along respective axes C and are angularly equi-spaced from each other around axis B and, in the case shown, are nine in number.

The rollers 22 are:
rotatable about the axes C with a rotational movement; and
simultaneously rotatable around axis B with a revolutionary movement.

Preferably, the rollers 22 are integrally movable with the female screw 21 with translation in a direction parallel to axis B.

Preferably, the thread angle of the thread 23 on the rollers 22 is equal to the thread angle of the female screw 21.

Due to the coupling between thread 23 and the screw 20, translation of the rollers 22 along axis B causes rotation of tubular body 33 about axis B.

Each roller 22 also comprises:
two mutually opposite axial ends 27 and 28; and
two cogwheels 45 and 46 arranged adjacent to the respective ends 27 and 28.

The threads 23 of the rollers 22 are single-start threads.

It is important to underline that the angles of the threads 23 of the rollers 22, of the screw 20 and of the female screw 21 shown in the accompanying figures are purely indicative.

The coupling between the threads 23 of the rollers 22 and the screw 20 and the female screw 21 is reversible.

The device 15 also comprises a pair of crowns 47 and 48, respectively fastened to the female screw 21 and made in one piece with the female screw 21.

The crowns 47 and 48 are coaxial with axis B and spaced out along axis B.

Each crown 47 and 48 has internal gear tooth 49 meshing with the respective cogwheels 45 and 46 of each roller 22.

In this way, the cogwheels 45 and 46 mesh with the gear tooth 49 (FIG. 4) during rotation of the rollers 22 around axis B.

The device 15 also comprises two disc-shaped supports 25 on axis B, spaced apart from each other along axis B and rotatable with respect to the female screw 21 and the screw 20.

Each support 25 defines a plurality of seats 26 angularly equi-spaced from each other around axis B and engaged by the axial ends 27 of respective rollers 22.

In the embodiment shown, there is radial play between the supports 25 and portion 36.

In an alternative embodiment, elements with a low coefficient of friction can be interposed between the supports 25 and portion 26 of the female screw 21.

The device 15 also comprises:
 a flywheel 40 rotating about the axis B and angularly integral with the screw 20; and
 two bearings 41 radially interposed between portion 37 of tubular body 33 and lug 31.

In the case shown, the flywheel 40 is located at the shoulder defined by portions 37 and 38 of the body 33.

The flywheel 40 rotates together with the screw 20 following vibration of tubular body 32 along axis B.

The flywheel 40 is sized so as to achieve a desired value for the rotating masses, equal to the sum of the masses of the rollers 22, tubular body 32 and the flywheel 40. This value of the rotating masses tunes the device 15 to a predetermined vibration frequency value of the casing 5 for which it is wished to dampen transmission to the fuselage 3.

The bearings 41 enable relative rotation of tubular body 33 with respect to lug 31 about axis B, and support the axial loads transmitted by the screw 20.

The ends 8 and 9 of the rod 7 are housed inside lugs 30 and 31, respectively.

The rod 7 extends, proceeding from end 8 towards end 9 along axis B, inside lug 30, tubular body 32, tubular body 33 and lug 31.

In particular, the diameter of the rod 7 is less than the internal diameter of the screw 23.

In use, the mast 6 drives the hub and the blades in rotation about axis A.

The rotation of the hub and the blades generates aerodynamic loads on the blades and consequent vibrations, which are transmitted to the mast 6.

The rods 7 connect the fuselage 3 to the casing 5 of the rotor 4.

The operation of the helicopter 2 is illustrated hereinafter with reference to a single rod 7 and to a single device 15.

Operating the rotor 4 causes the generation of vibratory loads.

The hinging of the lug 30 about axis E prevents rotation of the female screw 21 about axis B.

Therefore, the vibratory loads cause an alternating translational vibration of lug 30, tubular body 32 and the female screw 21 parallel to axis B.

The alternating translation of the female screw 21 causes, as a result of the coupling between the thread 23 of the rollers 22 and the female screw 21, the alternating rotation of the supports 25 about axis B, and of the rollers 22 about their respective axes C.

At the same time, the rollers 22 describe an alternating revolutionary movement around axis B, because the respective cogwheels 45 and 46 mesh with the gear teeth 49 of the corresponding crowns 47 and 48.

Rotation of the rollers 22 about their respective axes C causes, as a result of the coupling between the threads 23 of the rollers 22 and the female screw 21, the alternating rotation of the screw 20, tubular body 33 and the flywheel 40 about axis B.

The bearings 41 prevent the transmission of this rotation to the fuselage 3 through lug 31, and support the axial loads transmitted by the screw 20.

The device 15 thus generates inertial vibratory torque on the flywheel 40 originating from the translational vibratory movement transmitted from the casing 5 to tubular body 32.

More specifically, this inertial vibratory torque is due to the alternating rotation of the rollers 22, the screw 20 and the flywheel 40.

Due to the alternating rotation of the rollers 22, tubular body 33, the screw 20 and the flywheel 40, the device 15 applies two equal forces on the points of constraint of the lugs 30 and 31 with the casing 5 and fuselage 3, respectively, these forces being opposed to each other and proportional to the relative acceleration between the aforementioned points of constraint.

These torque forces dampen the vibrations transmitted to the fuselage 3 because they tend to cancel the vibratory forces transmitted by the internal rod 7, thereby increasing the comfort of the occupants of the helicopter 2.

In other words, the device 15 implements an inerter.

From an examination of the kit 1 according to the present invention, the advantages that can be achieved therewith are evident.

In particular, the kit 1 comprises a plurality of inerter-type damping devices 15. The devices 15 each comprise a plurality of rollers 22 screwed on the associated screw 20 and female screw 21, and rotatable about respective axes B and C as a result of axial vibrations transmitted from the casing 5 to tubular body 32 and to the female screw 21.

Therefore, the device 15 is capable of transforming the axial vibrations of the tubular body 30 into alternating rotation of the rollers 22 about axes B and C and of the screw 20 and the flywheel 40 about the associated axes B.

This alternating rotation generates a force acting on the anchors 12 and 13 that is proportional to the relative acceleration of the anchors 12 and 13.

This force curbs the transmission of vibrations to the anchor 13, and therefore to the fuselage 3, improving perceived comfort inside the helicopter 2.

Due to the presence of the rollers 22 interposed between the respective screws 20 and female screws 21, the devices 15 of the kit 1 have low friction, high capacities and are long-lasting with respect to inerter devices of a known type and described in the introductory part of this description.

In addition, the presence of rollers 22 interposed between the screws 20 and female screws 21 makes the devices 15 particularly compact and accurate.

This makes application to the helicopter 2 particularly advantageous.

Each device 15 houses the rod 7 and is hinged to the associated anchors 12 and 13 about the same hinging axes D and E of the associated rod 7 to the anchors 12 and 13.

Consequently, the devices 15 do not require any substantial redesign of the helicopter 1 and make use of the anchors 12 and 13 already provided for fixing the rods 7 between the casing 5 and the top portion 10 of the fuselage 3.

Moreover, this makes the kit 1 retro-fittable in a particularly simple and inexpensive manner on already existing helicopters 2 equipped with rods 7.

To this end, it is sufficient to hinge the device 15 to the already existing anchors 12 and 13 about axes D and E.

The flywheel 40 enables tuning the force generated by the associated device 15 to a particular vibration frequency value to be dampened. In fact, it is sufficient to increase or reduce the rotational moment of inertia of the flywheel 40 to vary the frequency of vibrations mainly dampened by the associated device 15.

The crowns 47 and 48 enable rotation of the rollers 22 around the associated common axis B via the meshing between the respective gear teeth 49 and the cogwheels 45 and 46 of the rollers 22.

The support 25 of each device 1 keeps the respective rollers 22 angularly spaced out around axis B.

Finally, it is clear that modifications and variants can be made to the kit 1 described and illustrated herein without departing from the scope defined by the claims.

In particular, the female screw 21 could be connected to the fuselage 3 by lug 31 and the screw 20 could be connected to the casing 5 by lug 30.

Furthermore, in addition to revolving around axis B with respect to the screw 20, the rollers 22 could also be axially free to translate with respect the female screw 21 parallel to axis B.

In addition, the devices 15 could be housed inside the respective rods 7 or connected to further respective structural elements interposed between the top portion 10 of the fuselage 3 and the casing 5.

Furthermore, the kit 1 could comprise only one support 25 and only one crown 47 or 48.

Finally, the tubular elements 32 and 33 of each device 15 could be directly fastened to the associated rod 7.

The invention claimed is:

1. A kit for a helicopter, said helicopter comprising a fuselage and a rotor; the kit comprising at least one device adapted to dampen vibrations transmitted from said rotor to said fuselage and adapted for placement between said fuselage and said rotor;
   said device, in turn, comprising:
   a first threaded element operatively connectable to said rotor and adapted to, in use, vibrate parallel to a first axis (B);
   a second threaded element operatively connectable to said fuselage and operatively connected to said first threaded element so as to, in use, rotationally vibrate about said first axis (B); and
   a plurality of threaded rollers, which are screwed on said first and second threaded elements;
   wherein said rollers are rotatable about respective second axes (C) parallel to and separate from said first axis (B) with respect to said second threaded element;
   wherein said rollers are also rotatable about said axis (B) with respect to said first threaded element and to said second threaded element;
   wherein said second threaded element is a screw screwed on said rollers and said first threaded element is a female screw screwed on said rollers;
   said female screw defining a second thread that is internal with respect to said first axis (B) and screwed on said rollers;
   said screw defining a third thread that is external with respect to said first axis (B) and screwed on said rollers.

2. The kit according to claim 1, wherein said rollers are integrally movable with said first threaded element with translation in a direction parallel to said first axis (B).

3. The kit according to claim 1, wherein said device is an inerter.

4. The kit according to claim 1, wherein said rollers and said first threaded element have the same thread angles; and/or
   in that said rollers comprise a first single-start thread; and/or
   in that said first threaded element and second threaded element comprise a second and a third multi-start thread, respectively.

5. The kit according to claim 4, further comprising:
   a constraint element to constrain said second threaded element to said fuselage; and
   a bearing interposed between said first threaded element and said constraint element, so as to enable relative rotation of said second threaded element with respect to said constraint element about said first axis (B).

6. The kit according to claim 1, further comprising a flywheel rotatable about said first axis (B) and operatively connected to said rollers and said second threaded element.

7. The kit according to claim 6, wherein said flywheel is angularly integral with said second threaded element.

8. The kit according to claim 1, further comprising at least one crown fastened to said second threaded element;
   said crown comprising a gear tooth facing said first axis (B) and engaged by a plurality of gear teeth carried by respective rollers.

9. A kit for a helicopter, said helicopter comprising a fuselage and a rotor; the kit comprising at least one device adapted to dampen vibrations transmitted from said rotor to said fuselage and adapted for placement between said fuselage and said rotor;
   said device, in turn, comprising:
   a first threaded element operatively connectable to said rotor and adapted to, in use, vibrate parallel to a first axis (B);
   a second threaded element operatively connectable to said fuselage and operatively connected to said first threaded element so as to, in use, rotationally vibrate about said first axis (B); and
   a plurality of threaded rollers, which are screwed on said first and second threaded elements;
   wherein said rollers are rotatable about respective second axes (C) parallel to and separate from said first axis (B) with respect to said second threaded element;
   wherein said rollers are also rotatable about said axis (B) with respect to said first threaded element and to said second threaded element;
   wherein said kit further comprises at least one crown fastened to said second threaded element;
   said crown comprising a gear tooth facing said first axis (B) and engaged by a plurality of gear teeth carried by respective rollers.

10. The kit according to claim 1, further comprising a support element defining a plurality of seats engaged by said respective rollers in an angularly fixed manner;
    wherein said support element is angularly movable around said first axis (B) with respect to said first threaded element and said second threaded element.

11. A helicopter comprising:
    said fuselage;
    said rotor;
    a support casing of said rotor; and
    a plurality of connecting rods interposed between said fuselage and said support casing;
    wherein said helicopter comprises, for each said rod, a kit according to claim 1;
    wherein said damping device is interposed between said casing and said fuselage.

12. The helicopter according to claim 11, wherein said first threaded element and second threaded element are constrained to said rods.

13. The helicopter according to claim 11, wherein at least one said rod and said respective device are hinged to said fuselage about third axes (D) coincident with each other;
  wherein said at least one rod and said respective device are hinged to said rotor about respective fourth axes (E) that are coincident with each other.

14. The helicopter according to claim 11, wherein one of said rod and said device is housed inside the other of said rod and said device.

* * * * *